United States Patent
Matsuura et al.

(10) Patent No.: US 6,956,360 B2
(45) Date of Patent: Oct. 18, 2005

(54) SWITCHING POWER SUPPLY CONTROLLER AND SWITCHING POWER SUPPLY

(75) Inventors: Ken Matsuura, Chuo-ku (JP); Takeshi Uematsu, Chuo-ku (JP); Hiroshi Kawasaki, Chuo-ku (JP); Takakazu Imai, Chuo-ku (JP); Koichiro Miura, Chuo-ku (JP)

(73) Assignee: TDK Corporation, Tokyo (JP)

( * ) Notice: Subject to any disclaimer, the term of this patent is extended or adjusted under 35 U.S.C. 154(b) by 17 days.

(21) Appl. No.: 10/801,831

(22) Filed: Mar. 17, 2004

(65) Prior Publication Data

US 2004/0189272 A1 Sep. 30, 2004

(30) Foreign Application Priority Data

Mar. 28, 2003 (JP) .................................. 2003-091677

(51) Int. Cl.[7] .............................................. G05F 1/56
(52) U.S. Cl. ...................................................... 323/283
(58) Field of Search ................................ 323/282, 283, 323/284, 285, 351

(56) References Cited

U.S. PATENT DOCUMENTS

| | | | | |
|---|---|---|---|---|
| 5,642,267 A | * | 6/1997 | Brkovic et al. | ............... 363/16 |
| 5,920,475 A | * | 7/1999 | Boylan et al. | .............. 363/127 |
| 6,023,158 A | * | 2/2000 | Liu | ............................. 323/351 |
| 6,366,070 B1 | * | 4/2002 | Cooke et al. | ............... 323/284 |
| 2004/0189264 A1 | * | 9/2004 | Matsuura et al. | ........... 323/224 |

FOREIGN PATENT DOCUMENTS

| | | |
|---|---|---|
| JP | A 2001-251851 | 9/2001 |
| JP | A 2002-186251 | 6/2002 |
| JP | A 2002-238254 | 8/2002 |

OTHER PUBLICATIONS

Harada et al., "The Fundamentals of Switched–Mode Converters," pp 48–79.

* cited by examiner

*Primary Examiner*—Adolf Berhane
(74) *Attorney, Agent, or Firm*—Oliff & Berridge, PLC

(57) ABSTRACT

A controller 7A for generating a drive signal PS for switching control of a switching element in a switching power supply, includes a duty ratio generator 10, 11 for detecting a duty ratio D of the drive signal PS for controlling the switching element of the switching power supply, and generating a signal corresponding to the duty ratio; a control signal generator 13, 14 for generating a control signal CS on the basis of a difference between a target voltage $V_{REF}$ in the switching power supply and an output voltage $V_o$ detected in the switching power supply; an operation unit 15 for generating a signal corresponding to a product of the signal corresponding to the duty ratio, and the control signal CS; and a drive signal generator 16, 17 for generating the drive signal PS on the basis of the signal generated by the operation unit 15.

18 Claims, 12 Drawing Sheets

SWITCHING POWER SUPPLY CONTROLLER AND SWITCHING POWER SUPPLY

BACKGROUND OF THE INVENTION

1. Field of the Invention

The present invention relates to a switching power supply controller and a switching power supply.

2. Related Background Art

A switching power supply has such properties as small size, light weight, and high efficiency and is commonly used as a power supply for microcomputers as incorporated in various devices, personal computers, and so on. These personal computers and others are progressively advancing toward lower voltage and higher processing speed, while increasing the consumption current more and more. In the switching power supply, therefore, the load current suddenly increases or decreases according to the processing load in the personal computers and others. The switching power supply possesses the property of capability of readily adapting to a wide input voltage range and is also utilized as a power supply applicable in several countries in the world or as a power supply with a wide specification setting of input voltage. The switching power supply needs to insure the stable output voltage against change of the load current and input voltage as described above. Furthermore, even if the output voltage is in a transient response state to a sudden change of the load current or the input voltage, the switching power supply must recover quickly into a stable state.

For this reason, the switching power supply is equipped with a controller such as a controller IC [Integrated Circuit] or the like of a digital control system, and this controller quickly turns switching elements such as FETs [Field Effect Transistors] or the like on and off (cf. "The Fundamentals of Switched-Mode Converters," coauthored by Kousuke Harada, Tamotsu Ninomiya, and Bunken Ko and published by CORONA PUBLISHING CO., LTD.). The controller adopts the feedback control based on voltage mode control or current mode control to generate a PWM [Pulse Width Modulation] signal for turning the switching elements on and off on the basis of the output voltage or the like of the switching power supply. Where the gain of this controller is denoted by Gc, the gain of the entire system including the switching power supply is given by the product of the input voltage $V_I$ and the gain Gc.

SUMMARY OF THE INVENTION

In the conventional switching power supplies, however, as the input voltage $V_I$ varies, the gain of the entire system (=Gc×$V_I$) changes according to the variation. For this reason, where the input voltage $V_I$ is low, the gain of the entire system becomes so small as to increase the steady-state deviation and worsen the response. On the other hand, where the input voltage $V_I$ is high, the gain of the entire system becomes so large as to raise the risk of oscillation of the output voltage. In cases where a wide input voltage range is set as a specification for the switching power supply, the controller has to be designed so as to avoid oscillation and it is thus common practice to set the gain Gc, assuming the case of high input voltage $V_I$. Namely, the gain Gc is set at a relatively low value. In that case, the oscillation can be avoided at high input voltages $V_I$, but the response becomes worse at low input voltages $V_I$.

It is, therefore, an object of the present invention to provide a switching power supply controller and a switching power supply capable of stabilizing the gain of the entire system even with change of the input voltage.

A switching power supply controller according to the present invention is a switching power supply controller comprising: duty ratio generating means for detecting a duty ratio of a drive signal for controlling a switching element of a switching power supply and generating a signal corresponding to the duty ratio; control signal generating means for generating a control signal on the basis of a difference between a target voltage in the switching power supply and an output voltage detected in the switching power supply; operation means for generating a signal corresponding to a product of the signal corresponding to the duty ratio, and the control signal; and drive signal generating means for generating the drive signal on the basis of the signal generated by the operation means.

In this switching power supply controller, in order to control the output voltage toward the target voltage by feedback control, the control signal generating means generates the control signal on the basis of the difference between the target voltage and the actual output voltage of the switching power supply. In the controller, the duty ratio generating means detects the duty ratio of the drive signal and generates the signal corresponding to the detected duty ratio. Furthermore, in the controller the operation means generates the signal corresponding to the product of the control signal and the signal corresponding to the duty ratio. In the controller the drive signal generating means then generates the drive signal on the basis of the signal generated by the operation means. In the controller, the duty ratio being the output of the controller is fed back, the input voltage is estimated by this duty ratio, and the gain in the controller is adjusted by utilizing the estimated value. The gain of the entire system including the switching power supply is given by the value of the product of the gain of the controller and the input voltage. Here the gain of the controller is adjusted so as to cancel out the input voltage and the estimated value of the input voltage in the gain of the entire system. In this controller, therefore, the gain of the entire system of the switching power supply is stabilized even with change of the input voltage. The duty ratio generating means can be configured as means for directly detecting the duty ratio from the drive signal outputted by the controller, or can be configured as means using a value resulting from an operation in the controller (e.g., a value resulting from an operation by the operation means, or an integration control value by integral control).

The drive signal is a signal for turning the switching element of the switching power supply on and off, e.g., a PWM signal. The control signal is a signal for feedback control and signal based on the target voltage and the output voltage actually detected in the switching power supply. The duty ratio is a rate of an on period of the switching element in one cycle of the drive signal (i.e., a rate of an on period in one cycle of switching operation) and, for example, is equivalent to a pulse width or duty ratio in each cycle of the PWM signal. The signal corresponding to the duty ratio can be one selected from a variety of signals indicating the duty ratio; for example, it can be a signal of a duty ratio actually detected from the drive signal, a signal indicating an average of duty ratios detected, or a value resulting from an operation in the controller, equivalent to the duty ratio or the average duty ratio.

Incidentally, a transfer function of the controller varies depending upon a transfer function of the control signal generating means. The transfer function of the control signal generating means is adjusted to increase the low-frequency gain so as to secure the accuracy of output voltage on a steady-state basis, and to adjust the high-frequency gain and the phase so as to achieve both quick response and stability of the system.

The above switching power supply controller of the present invention may be configured so that the control signal generating means comprises phase compensation means for carrying out a process for compensating for a phase in the switching power supply controller, for the difference.

In this switching power supply controller, the phase compensation means performs the process for compensating for the phase in the controller, for the difference between the target voltage and the output voltage, to generate the control signal. The phase compensation means can be, for example, a high-pass filter and, where the high-pass filter is applied, the phase of the transfer function of the controller leads.

The above switching power supply controller of the present invention may also be configured so that the control signal generating means comprises gain adjustment means for carrying out a process for adjusting a gain in the switching power supply controller, for the difference.

In this switching power supply controller, the gain adjustment means performs the process for adjusting the gain in the controller, for the difference between the target voltage and the output voltage, to generate the control signal. The gain adjustment means can be, for example, a multiplier and, where the multiplier is applied, the gain of the transfer function of the controller varies. The gain adjustment means can also be an integrator and, where the integrator is applied, the low-frequency gain of the transfer function of the controller increases. The gain adjustment means can also be a low-pass filter, and, where the low-pass filter is applied, the high-frequency gain of the transfer function of the controller decreases.

The above switching power supply controller of the present invention may also be configured in a configuration comprising gain adjustment value setting means for setting a gain adjustment value on the basis of the signal corresponding to the duty ratio and the output voltage detected in the switching power supply, wherein the operation means generates a signal corresponding to a product of the gain adjustment value and the control signal.

In this switching power supply controller, the gain adjustment value setting means sets the gain adjustment value on the basis of the signal corresponding to the duty ratio, and the output voltage. In this controller, the operation means then generates the signal corresponding to the product of the gain adjustment value and the control signal. In this manner, the controller estimates an average input voltage from the output voltage and the signal corresponding to the duty ratio.

The above switching power supply controller of the present invention is preferably configured in a configuration comprising output voltage averaging means for obtaining an average of output voltages detected in the switching power supply, wherein the gain adjustment value setting means sets the gain adjustment value on the basis of the signal corresponding to the duty ratio and the average output voltage obtained by the output voltage averaging means.

In this switching power supply controller, the output voltage averaging means obtains the average output voltage. In this controller, the gain adjustment value setting means then sets the gain adjustment value on the basis of the signal corresponding to the duty ratio, and the average output voltage. Where the output voltage varies, the controller is able to estimate an average input voltage with a high degree of accuracy, based on the average output voltage.

The above switching power supply controller of the present invention may also be configured in a configuration comprising gain adjustment value setting means for setting a gain adjustment value on the basis of the signal corresponding to the duty ratio, and the target voltage in the switching power supply, wherein the operation means generates a signal corresponding to a product of the gain adjustment value and the control signal.

In this switching power supply controller, the gain adjustment value setting means sets the gain adjustment value on the basis of the signal corresponding to the duty ratio, and the target voltage. In this controller, the operation means then generates the signal corresponding to the product of the gain adjustment value and the control signal. In this manner, the controller estimates the average input voltage from the target voltage and the signal corresponding to the duty ratio. For this reason, this controller is able to estimate the average input voltage, without using the actual output voltage, and, therefore, the configuration can be simplified.

The above switching power supply controller of the present invention is preferably configured in a configuration wherein the duty ratio generating means comprises duty ratio averaging means for obtaining an average of duty ratios detected, and wherein the gain adjustment value setting means sets the gain adjustment value on the basis of the average duty ratio obtained by the duty ratio averaging means and the target voltage in the switching power supply.

In this switching power supply controller, the duty ratio averaging means obtains the average of duty ratios detected. In this controller, the gain adjustment value setting means then sets the gain adjustment value on the basis of the average duty ratio and the target voltage. Where the duty ratio varies, the controller is able to estimate the average input voltage with a high degree of accuracy, based on the average duty ratio.

In the switching power supply permitting setting of a plurality of target voltages, (duty ratio/output voltage) or (duty ratio/target voltage) is proportional to an inverse of the input voltage.

In the above switching power supply controller of the present invention, the duty ratio averaging means may be constructed of a low-pass filter.

In this switching power supply controller, the duty ratio detected is fed into the low-pass filter and the low-pass filter obtains an average of duty ratios received in the past. This controller permits the averaging means to be constructed in a simple configuration making use of the averaging function of the low-pass filter.

The above switching power supply controller of the present invention may also be configured in a configuration wherein the duty ratio generating means comprises a counter, and wherein the counter performs a counting operation every given time to detect an on period of the switching element in the drive signal.

In this switching power supply controller, the drive signal outputted from the controller is fed back to the counter. In the controller, the counter then performs the counting operation every given time of a master clock or the like in the controller to detect an on period of the switching element in the drive signal. Since this count value is equivalent to the duty ratio, this controller permits the duty ratio generating means to be readily constructed of the counter.

The above switching power supply controller of the present invention may also be configured in a configuration wherein the duty ratio generating means comprises a delay device, and wherein the delay device holds the signal generated by the operation means, for a predetermined time.

In this switching power supply controller, the signal generated by the operation means is fed back to the delay device. In the controller, the delay device then holds the signal generated by the operation means, for the predetermined time and generates the signal corresponding to the duty ratio, based on the signal thus held. Since the value of this signal generated by the operation means is equivalent to the duty ratio, this controller permits the duty ratio generating means to be readily constructed of the delay device.

The above switching power supply controller of the present invention may be configured in a configuration comprising integration control means for integrating the difference between the target voltage in the switching power supply and the output voltage detected in the switching power supply to generate an integration control value, wherein the duty ratio generating means is comprised of the integration control means and wherein the integration control value generated by the integration control means is the signal corresponding to the duty ratio.

This switching power supply controller comprises the integration control means, and the integration control means integrates the difference between the target voltage and the output voltage to generate the integration control value. Since this integration control value is equivalent to the signal corresponding to the average duty ratio, the operation means in the controller generates the signal corresponding to the product of the integration control value and the control signal. In the controller, as described above, the integration control means serves as means for generating the duty ratio and as means for obtaining the average duty ratio, and, therefore, the configuration for adjusting the gain can be simplified.

The above switching power supply controller of the present invention may also be configured in a configuration wherein the gain adjustment value setting means comprises a divider, and wherein the divider divides the signal corresponding to the duty ratio generated by the duty ratio generating means, by the output voltage detected in the switching power supply, by the average output voltage obtained by the output voltage averaging means, or by the target voltage in the switching power supply to set the gain adjustment value.

This switching power supply controller has the divider as a specific configuration of the gain adjustment value setting means, and the divider divides the signal corresponding to the duty ratio, by the output voltage, the average output voltage, or the target voltage to set the gain adjustment value.

The above switching power supply controller of the present invention may also be configured in a configuration wherein the gain adjustment value setting means comprises converting means and a multiplier, wherein the converting means sets a conversion value for the output voltage detected in the switching power supply, the average output voltage obtained by the output voltage averaging means, or the target voltage in the switching power supply, and wherein the multiplier multiplies the signal corresponding to the duty ratio generated by the duty ratio generating means, by the conversion value set by the converting means, to set the gain adjustment value.

This switching power supply controller has the converting means and the multiplier as a specific configuration of the gain adjustment value setting means, and this converting means sets the conversion value for the output voltage, the average output voltage, or the target voltage. In this controller, the multiplier then multiplies the signal corresponding to the duty ratio by the conversion value set by the converting means, to set the gain adjustment value. For this reason, the controller does not require the divider of the complex circuit configuration for setting the gain adjustment value, and the circuit configuration can be simplified. The converting means can be a table containing conversion values set against output voltages, average output voltages, or target voltages.

The above switching power supply controller of the present invention is preferably configured in a configuration wherein the converting means sets the conversion value which linearly decreases against the output voltage detected in the switching power supply, the average output voltage obtained by the output voltage averaging means, or the target voltage in the switching power supply.

In this switching power supply controller, the converting means sets the conversion value linearly decreasing against the output voltage, the average output voltage, or the target voltage. In this manner, the converting means sets the conversion value not to be an inverse of the average output voltage or the like but to be a value of a first-order function linearly decreasing, whereby variation becomes smaller in the gain of the entire system. A conceivable reason for it is that the optimal value deviates from an inverse value of the average output voltage or the like because of the factor of internal loss or the like in the switching power circuit. In the case where the conversion value is the first-order function value, the converting means can be comprised of a multiplier with a negative proportionality factor and an adder for adding an intercept, whereby the circuit configuration can be simplified.

A switching power supply according to the present invention is a switching power supply comprising: a controller for generating a drive signal for switching control of a switching element; and a switching element adapted to turn on and off on the basis of the drive signal generated by the controller, wherein the controller is one of the controllers described above.

This switching power supply comprises the controller configured as one of the above controllers, and the switching element is turned on and off by the drive signal generated based on the gain adjusted by the signal corresponding to the duty ratio (especially, the signal corresponding to the duty ratio, and the output voltage or the target voltage). In this switching power supply, the input voltage is converted into the output voltage so as to achieve the target voltage by on/off of the switching element. Since this switching power supply is controlled by the above controller, the gain of the entire system equals the gain of the controller, whereby the gain of the entire system is stabilized even with change of the input voltage.

DESCRIPTION OF THE PREFERRED EMBODIMENTS

Embodiments of the switching power supply controller and the switching power supply according to the present invention will be described below with reference to the drawings.

In the embodiments of the present invention, the switching power supply according to the present invention is applied to a buck DC/DC converter, and the switching power supply controller according to the present invention is applied to a controller IC which generates the PWM signal for controlling switching elements of the DC/DC converter. The controller IC in each embodiment is of a digital control type to implement fast processing, and performs the feedback control of the DC/DC converter by voltage mode control. The embodiments of the present invention include four embodiments according to difference in control, difference in the configuration of the duty ratio generating means, or difference in the configuration of the gain adjustment value setting means: the first embodiment is an embodiment of P [Proportional] control wherein the duty ratio generating means is comprised of a counter and the gain adjustment value setting means of a divider; the second embodiment is different from the first embodiment in that the duty ratio generating means is comprised of a D flip-flop circuit; the third embodiment is different from the first embodiment in that the gain adjustment value setting means is comprised of a table and a multiplier; the fourth embodiment is different from the first embodiment in that the control is PI [Proportional Integral] control wherein the configuration of the I control serves as means for generating the duty ratio and as means for obtaining the average duty ratio.

Figure 1:
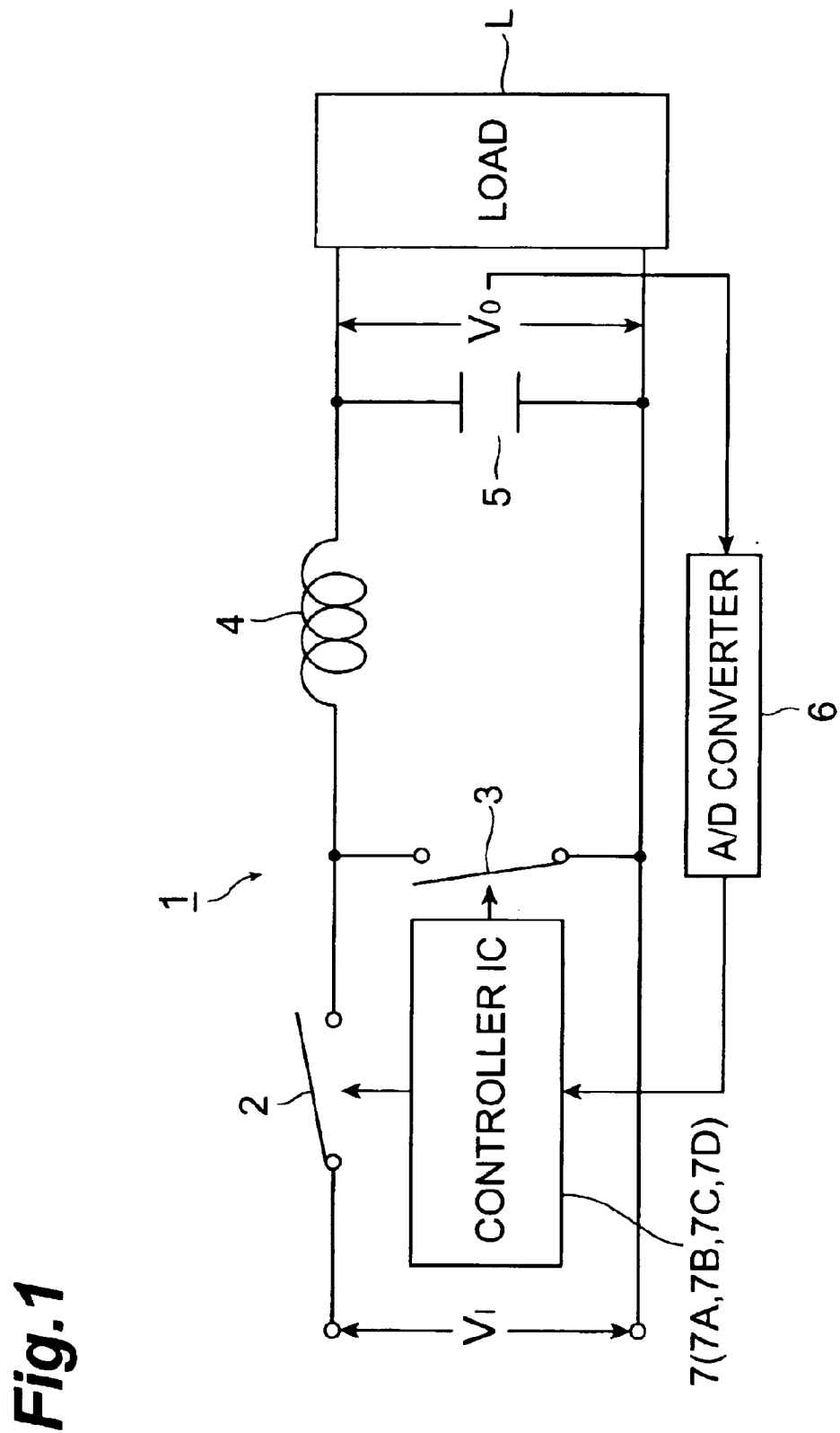
FIG. 1 is a diagram showing a configuration of a DC/DC converter in embodiments of the present invention.

The configuration of the DC/DC converter 1 will be described with reference to FIG. 1. FIG. 1 is a diagram showing the configuration of the DC/DC converter.

The DC/DC converter 1 is a power supply circuit for converting a DC input voltage $V_I$ into a DC output voltage $V_o$ ($<V_I$) and can be used in various applications, e.g., in a VRM [Voltage Regulator Module]. The DC/DC converter 1 is a switching regulator for switching elements on and off by PWM control. The input voltage $V_I$ is variable and an input voltage range (e.g., 5–12 V) is set for it. For the output voltage $V_o$, a constant target voltage (e.g., 1 V) is set according to a load L. The load L is, for example, a load which represents a CPU, an MPU, or a DSP in communication equipment such as computers, routers, etc. and which largely varies its load current according to a processing load.

The DC/DC converter 1 is mainly composed of two switching elements 2, 3 such as FETs, an inductor 4, a capacitor 5, an A/D converter 6, and a controller IC 7. The switching element 2 turns on when the PWM signal from the controller IC 7 is high. The switching element 3 turns on when the PWM signal is low. The inductor 4 and capacitor 5 constitute a smoothing circuit. The switching operation of the switching elements 2, 3 results in feeding a pulsed voltage with amplitude equal to the input voltage $V_I$ to the smoothing circuit, and the smoothing circuit averages the pulsed voltage. The A/D converter 6 converts an analog output voltage $V_o$ detected by a voltage sensor (not shown), into a digital output voltage $V_o$ and outputs the digital output voltage $V_o$ to the controller IC 7. The controller IC 7 generates the PWM signal by the voltage mode control based on the digital output voltage $V_o$ so as to make the output voltage $V_o$ equal to the target voltage, and controls on/off of the switching elements 2, 3.

Figure 2:
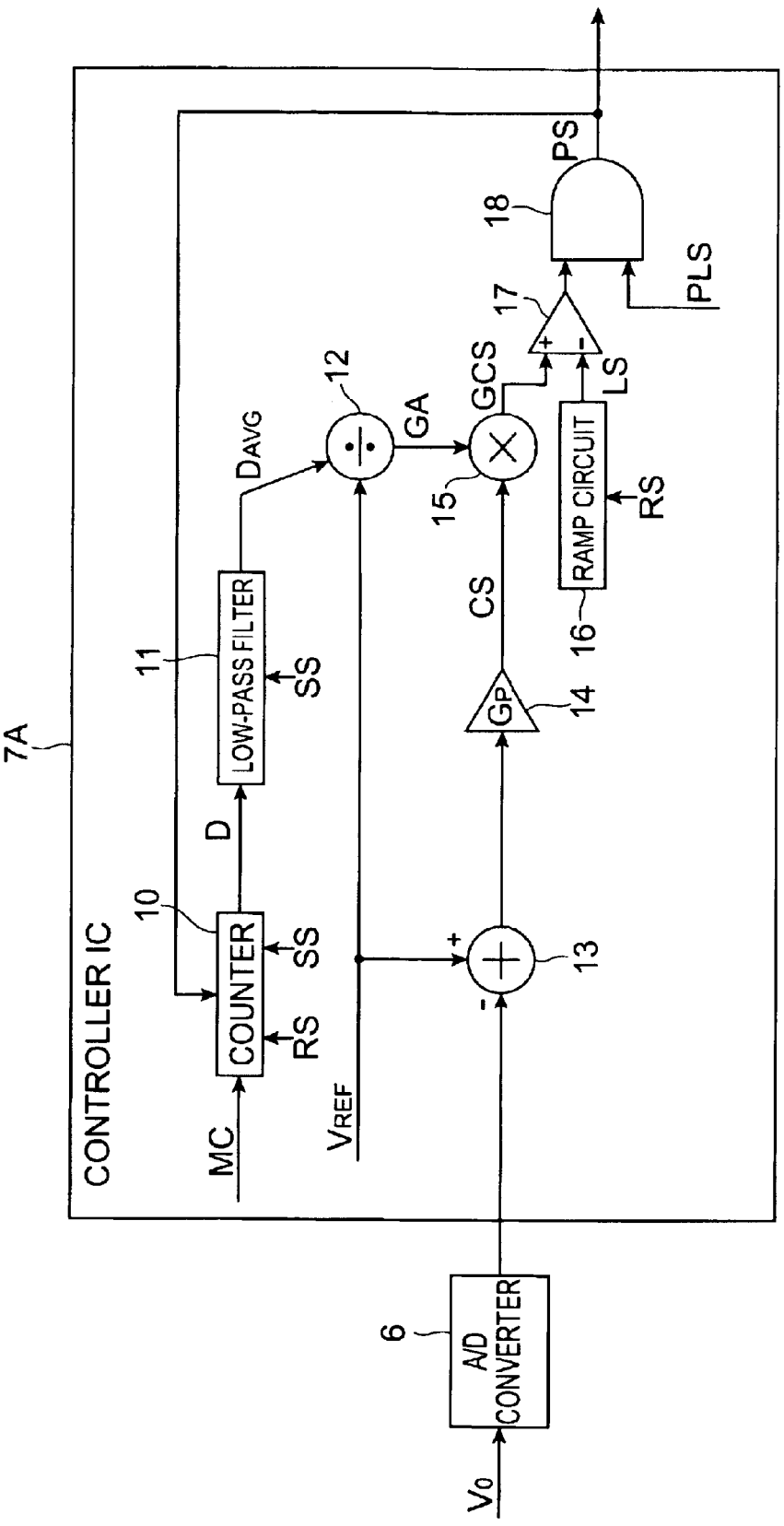
FIG. 2 is a diagram showing a configuration of a controller IC in the first embodiment.
Figure 3:
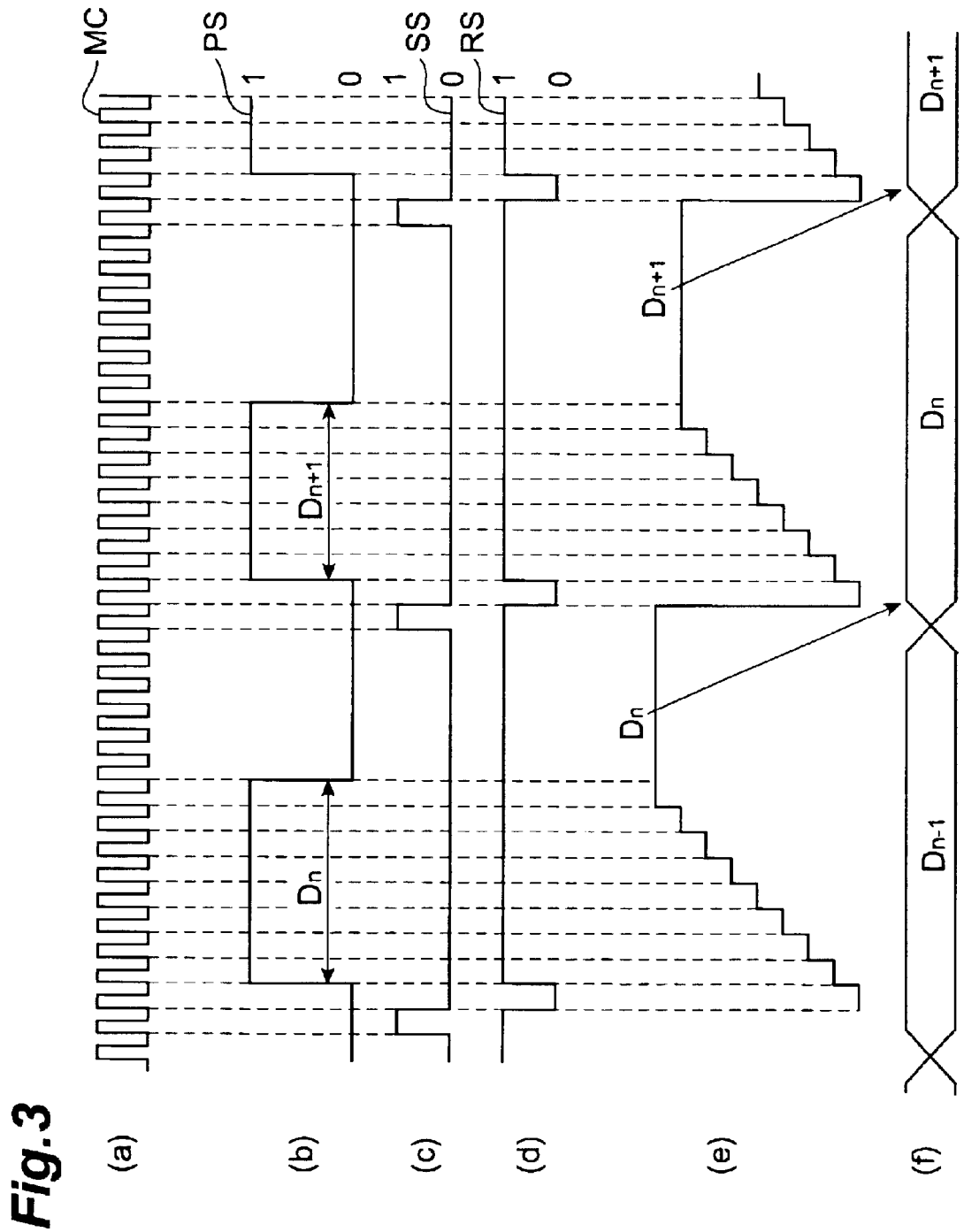
FIG. 3 is an illustration to illustrate detection of the pulse width at a counter in FIG. 2, wherein (a) represents a master clock, (b) a PWM signal, (c) a sample clock signal, (d) a reset signal, (e) a count-up operation at the counter, and (f) count-up values (pulse widths) held.
Figure 4A:
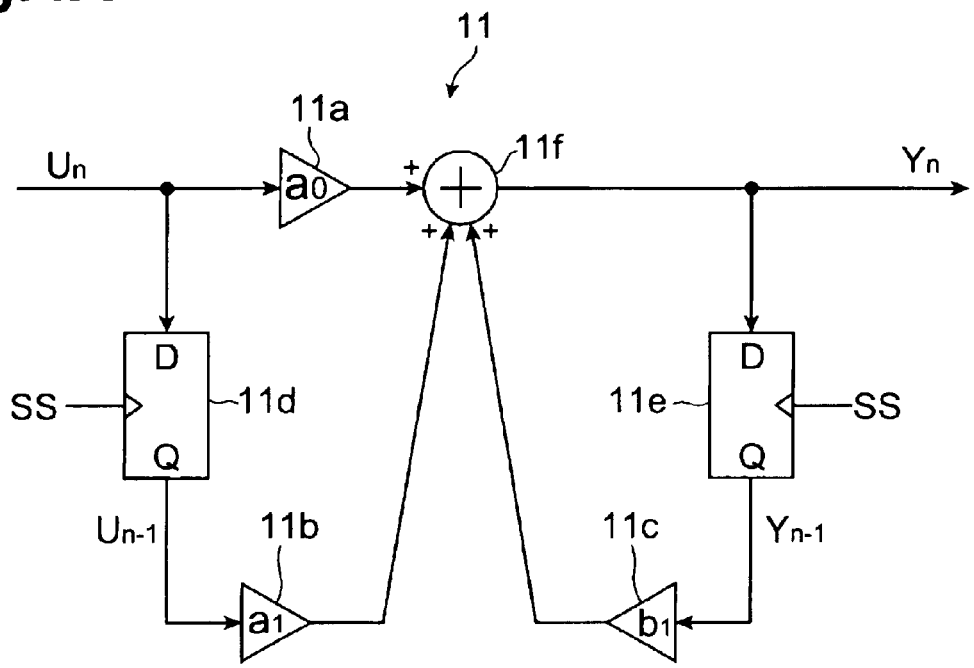
FIG. 4A is a block diagram of a low-pass filter in FIG. 2.
Figure 4B:
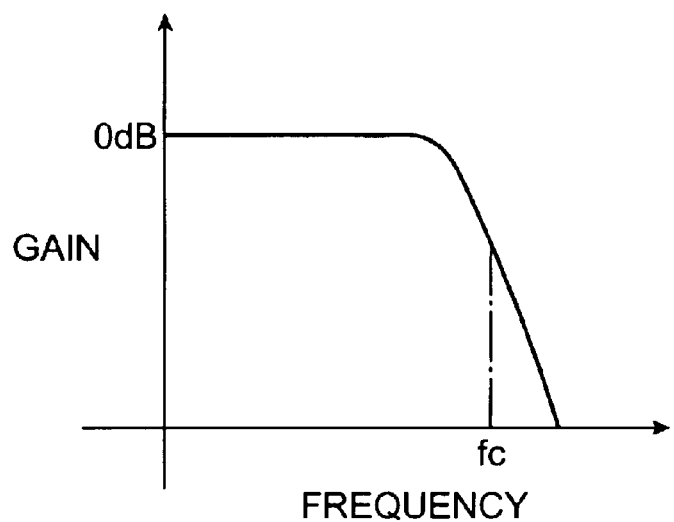
FIG. 4B is a frequency-gain characteristic diagram of the low-pass filter in FIG. 2.
Figure 5:
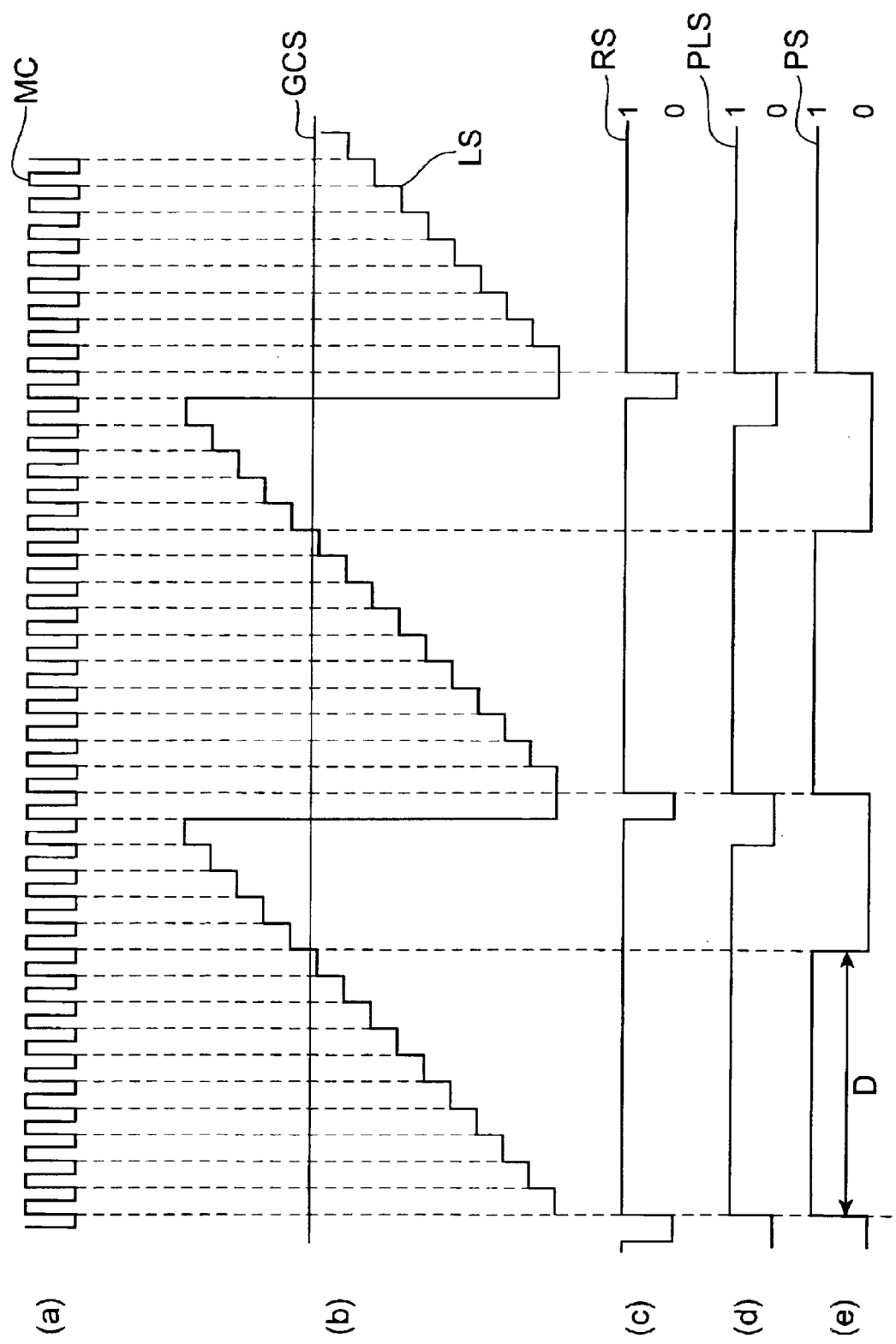
FIG. 5 is an illustration to illustrate voltage mode control in the controller IC of FIG. 2, wherein (a) represents a master clock, (b) a ramp signal and a gain adjustment control signal, (c) a reset signal, (d) a pulse width limiting signal, and (e) a PWM signal.

The configuration of the controller IC 7A according to the first embodiment will be described with reference to FIGS. 2 to 5. FIG. 2 is a diagram showing the configuration of the controller IC according to the first embodiment. FIG. 3 is an illustration to illustrate the detection of the pulse width at the counter in FIG. 2, wherein (a) represents a master clock, (b) a PWM signal, (c) a sample clock signal, (d) a reset signal, (e) a count-up operation at the counter, and (f) count-up values (pulse widths) held. FIG. 4A is a block diagram of the low-pass filter in FIG. 2, and FIG. 4B a frequency-gain characteristic diagram of the low-pass filter in FIG. 2. FIG. 5 is an illustration to illustrate the voltage mode control in the controller IC of FIG. 2, wherein (a) represents a master clock, (b) a ramp signal and a gain adjustment control signal, (c) a reset signal, (d) a pulse width limiting signal, and (e) a PWM signal.

The controller IC 7A is a digital circuit that operates based on the master clock (e.g., 10 MHz–100 MHz). The controller IC 7A performs the feedback control based on the P control to multiply the difference between the digital output voltage $V_o$ after the conversion in the A/D converter 6 and the target voltage $V_{REF}$ by the gain Gp of the P control to generate the control signal CS, and to generate the PWM signal PS from the control signal CS and the ramp signal LS. Particularly, in the controller IC 7A, the generated PWM signal PS is fed back through a minor loop, and the gain of the controller IC 7A is adjusted by an average $D_{AVG}$ of pulse widths D (duty ratios) of the PWM signal PS, and the target voltage $V_{REF}$. For that, the controller IC 7A is comprised of a counter 10, a low-pass filter 11, a divider 12, a subtractor 13, a multiplier 14, a multiplier 15, a ramp circuit 16, a comparator 17, and an AND circuit 18. In the description hereinafter, a high signal is set at a power-supply voltage (e.g., 5 V) or the like in the controller IC 7A and is indicated by 1 in the drawings. A low signal is set at 0 V and indicated by 0 in the drawings.

In the first embodiment, the counter 10 and the low-pass filter 11 correspond to the duty ratio generating means in the claims; the low-pass filter 11 to the duty ratio averaging means in the claims; the divider 12 to the gain adjustment value setting means in the claims; the subtractor 13 and the multiplier 14 to the control signal generating means in the claims; the multiplier 14 to the gain adjustment means in the claims; the multiplier 15 to the operation means in the claims; the ramp circuit 16 and the comparator 17 to the drive signal generating means in the claims.

The counter 10 detects the pulse width D (duty ratio) of the PWM signal PS. For that, the counter 10 receives the PWM signal PS generated in the controller IC 7A, and the reset signal RS and the sample clock signal SS. The counter 10 performs a count-up operation every cycle of the master clock MC during a period in which the PWM signal PS is high. The counter 10 holds a count-up value while the PWM signal PS is low (cf. FIGS. 3(*a*), (*b*), and (*e*)). Then the counter 10 resets the held count-up value to 0 when the reset signal RS turns to the low level (cf. FIGS. 3(*d*) and (*e*)). The counter 10 holds the count-up value as a pulse width D when the sample clock signal SS turns to the high level (cf. FIGS. 3(*c*), (*e*), and (*f*)), and outputs the held pulse width D to the low-pass filter 11 until the sample clock signal SS turns to the high level in the next cycle. In passing, since the period of the PWM signal PS is constant, the pulse width D indicates a rate of an on period of the switching element 2 in one cycle of the PWM signal PS, and is equivalent to the duty ratio.

The reset signal RS is a signal resulting from frequency division of the master clock MC by a frequency divider (not shown) and signal to define one cycle of the PWM signal PS (a switching cycle of the DC/DC converter 1), and provides a low signal output of a pulse (one cycle of the master clock MC) defining a rise from the low level to the high level of the PWM signal PS. The frequency of the PWM signal PS is, for example, 100 kHz–1 MHz and is equivalent to the switching frequency in the DC/DC converter 1. The sample clock signal SS is a signal resulting from frequency division of the master clock MC by a frequency divider, and signal having the same period as the period of the PWM signal PS, as shown in FIG. 3 (*c*). The sample clock signal SS provides a high signal output of a pulse (one cycle of the master clock MC) for holding a count-up value immediately before reset by the reset signal RS.

The low-pass filter 11 is a first-order low-pass filter of the IIR [Infinite Impulse Response] type, and infinitely averages the pulse widths D received in the past, by the averaging function of this filter. The low-pass filter 11, as shown in FIG. 4A, is comprised of three multipliers 11*a*, 11*b*, 11*c*, two D flip-flop circuits 11*d*, 11*e*, and an adder 11*f*. The multiplier 11*a* multiplies an input value $U_n$ by a filter coefficient a0 and outputs the product to the adder 11*f*. The D flip-flop circuit 11*d* receives an input value $U_n$, holds a right previous value $U_{n-1}$ of the input value on the basis of the sample clock signal SS, and outputs $U_{n-1}$ to the multiplier 11*b*. The multiplier 11*b* multiplies the right previous value $U_{n-1}$ of the input value by a filter coefficient a1 and outputs the product to the adder 11*f*. The D flip-flop circuit 11*e* receives an output value $Y_n$, holds a right previous value $Y_{n-1}$ of the output value on the basis of the sample clock signal SS, and outputs $Y_{n-1}$ to the multiplier 11*c*. The multiplier 11*c* multiplies the right previous value $Y_{n-1}$ of the output value by a filter coefficient b1 and outputs the product to the adder 11*f*. The adder 11*f* adds up the products from the respective multipliers 11*a* to 11*c*, and outputs the result as an output value $Y_n$. The low-pass filter 11 has a cut-off frequency fc, has the gain characteristic to pass low-frequency components, as shown in FIG. 4B, and has the gain of 1.

$$Y_n = a0 \times U_n + a1 \times U_{n-1} + b1 \times Y_{n-1} \quad (1)$$

The low-pass filter 11 is represented by Eq (1), wherein $U_n$ represents the pulse width $D_n$ from the counter 10, and $Y_n$ the average $D_{AVG}$ of pulse widths received in the past.

The divider 12 receives the target voltage $V_{REF}$ and the average pulse width $D_{AVG}$, divides the average $D_{AVG}$ by the target voltage $V_{REF}$, and outputs the quotient ($D_{AVG}/V_{REF}$) as a gain adjustment value GA to the multiplier 15.

The subtractor 13 receives the target voltage $V_{REF}$ and the output voltage $V_o$, subtracts the output voltage $V_o$ from the target voltage $V_{REF}$, and outputs the difference ($V_{REF}-V_o$) between them to the multiplier 14.

The multiplier 14 receives the difference ($V_{REF}-V_o$), multiplies the difference ($V_{REF-Vo}$) by the gain Gp of the P control, and outputs the product Gp ($V_{REF}-V_o$) as a control signal CS to the multiplier 15.

The multiplier 15 receives the gain adjustment value GA and the control signal CS, multiplies the control signal CS by the gain adjustment value GA, and outputs the product as a gain adjustment control signal GCS to the comparator 17. Here the gain Gp of P control is multiplied by the gain adjustment value GA whereby the gain Gc of the controller IC 7A equals Gp×($D_{AVG}/V_{REF}$).

The ramp circuit 16 generates the ramp signal LS with a ramp coefficient of 1. For that, the ramp circuit 16 receives the reset signal RS. The ramp circuit 16 counts up by the ramp coefficient of 1 every cycle of the master clock MC (cf. FIGS. 5(*a*) and (*b*)). Then the ramp circuit 16 resets the count-up value to 0 when the reset signal RS turns to the low level (cf. FIGS. 5(*b*) and (*c*)). As described, the ramp signal LS is a signal increasing by the ramp coefficient of 1 and turning to 0 immediately before a rise from the low level to the high level of the PWM signal PS.

The comparator 17 determines whether the ramp signal LS exceeds the gain adjustment control signal GCS. For that, the comparator 17 receives the gain adjustment control signal GCS through a non-inverting input terminal and the ramp signal LS through an inverting input terminal. The comparator 17 compares the gain adjustment control signal GCS with the ramp signal LS, outputs a high signal before the ramp signal LS exceeds the gain adjustment control signal GCS, and outputs a low signal after the ramp signal LS exceeds the gain adjustment control signal GCS (cf. FIGS. 5(*b*) and (*e*)).

The AND circuit 18 limits the pulse width of the PWM signal PS and outputs the PWM signal PS. For that, the AND circuit 18 receives the output signal from the comparator 17 and the pulse width limiting signal PLS (cf. FIG. 5(*d*)). The AND circuit 18 outputs a high signal if the output signal from the comparator 17 is high and if the pulse width limiting signal PLS is high, and outputs a low signal otherwise (cf. FIGS. 5(*d*) and (*e*)). The signal consisting of high and low signals is the PWM signal PS, and the period of this high signal is the pulse width D of the PWM signal PS.

The pulse width limiting signal PLS is a signal resulting from frequency division of the master clock MC by a frequency divider, and has the same period as the period of the PWM signal PS. It provides a high signal output during an interval to define a maximum pulse width permitted for the PWM signal PS (in turn, a maximum output voltage permitted for the DC/DC converter 1).

The operation of the controller IC 7A and the DC/DC converter 1 will be described with reference to FIGS. 1 to 5.

The input voltage $V_I$ is fed into the DC/DC converter 1. In the DC/DC converter 1 the switching elements 2, 3 then alternately turn on and off based on the PWM signal from the controller IC 7A. Furthermore, in the DC/DC converter 1 the inductor 4 and capacitor 5 average the input voltage Voutputted as pulses during on periods of the switching element 2, and output the voltage $V_o$. In the DC/DC converter 1, a voltage sensor detects the output voltage $V_o$, the detected output voltage $V_o$ is digitized by the A/D converter 6, and the digital output voltage $V_o$ is fed back to the controller IC 7A.

In the controller IC 7A, the output voltage $V_o$ is subtracted from the target voltage $V_{REF}$, and the difference is multiplied by the gain Gp of P control to generate the control signal CS. The controller IC 7A detects the pulse width D of the generated PWM signal PS, and infinitely averages the pulse widths D detected in the past, to obtain an average pulse width $D_{AVG}$. Furthermore, the controller IC 7A divides the average pulse width $D_{AVG}$ by the target voltage $V_{REF}$ to obtain the gain adjustment value GA. Then the controller IC 7A multiplies the control signal CS by the gain adjustment value GA to generate the gain adjustment control signal GCS. The controller IC 7A also generates the ramp signal LS by the ramp coefficient (=1). Then the controller IC 7A compares the gain adjustment control signal GCS with the ramp signal LS, outputs a high signal during a period in which the ramp signal LS is not over the gain adjustment control signal GCS, and outputs a low signal in a period in which the ramp signal LS is over the gain adjustment control signal GCS. Finally, the controller IC 7A limits the pulse width by the pulse width limiting signal PLS and outputs the PWM signal PS.

Described below is the reason why the control signal CS (the gain Gp of P control) is multiplied by the gain adjustment value GA to adjust the gain of the controller IC 7A. In the description below, the gain of the controller IC 7A (i.e., the gain of the control system) is represented by Gc, and the gain of the entire system including the DC/DC converter 1 by G.

$$Gc = Gp \times (D_{AVG}/V_{REF}) \quad (2)$$

$$G = Gc \times V_I \quad (3)$$

The gain Gc of the controller IC 7A is a value resulting from multiplication of the gain Gp of P control by the gain adjustment value GA, as indicated by Eq (2). The gain G of the entire system is a value resulting from multiplication of the gain Gc by the input voltage $V_I$, as indicated by Eq (3).

$$D = V_o/V_I \quad (4)$$

$$V_I = V_o/D \quad (5)$$

$$V_{I\_AVG} = V_{o\_AVG}/D_{AVG} \quad (6)$$

The duty ratio (pulse width) D is a value obtained by dividing the output voltage $V_o$ by the input voltage $V_I$, as indicated by Eq (4). From the relation of Eq (5) obtained by arranging Eq (4), the input voltage $V_I$ is a value obtained by dividing the output voltage $V_o$ by the duty ratio D. Accordingly, the average input voltage $V_{I\_AVG}$ is a value obtained by dividing the average output voltage $V_{o\_AVG}$ by the average duty ratio $D_{AVG}$, as indicated by Eq (6).

Since the output voltage $V_o$ is feedback controlled toward the target voltage $V_{REF}$, the output voltage $V_o$ varies with respect to the target voltage $V_{REF}$. For this reason, the average output voltage $V_{o\_AVG}$ can be assumed to be equal to the target voltage $V_{REF}$.

$$V_{I\_AVG} = V_{REF}/D_{AVG} \quad (7)$$

Accordingly, the average input voltage $V_{I\_AVG}$ is a value obtained by dividing the target voltage $V_{REF}$ by the average duty ratio $D_{AVG}$, as indicated by Eq (7).

$$Gc = Gp/V_{I\_AVG} \quad (8)$$

From Eq (2) and Eq (7), the gain Gc of the controller IC 7A is given as a value obtained by dividing the gain Gp of P control by the average input voltage $V_{I\_AVG}$, as indicated by Eq (8).

$$G = (Gp/V_{I\_AVG}) \times V_I \quad (9)$$

$$G = Gp \quad (10)$$

From Eq (3) and Eq (8), the gain G of the entire system is given as indicated by Eq (9). Here the input voltage $V_I$ and the average input voltage $V_{I\_AVG}$ can be assumed to be equal on a steady-state basis. For this reason, the input voltage $V_I$ and the average input voltage $V_{I\_AVG}$ are canceled out in Eq (9), so that the gain G of the entire system is not proportional to the input voltage $V_I$ but equal to the gain Gp of P control, as indicated by Eq (10).

Figure 6:
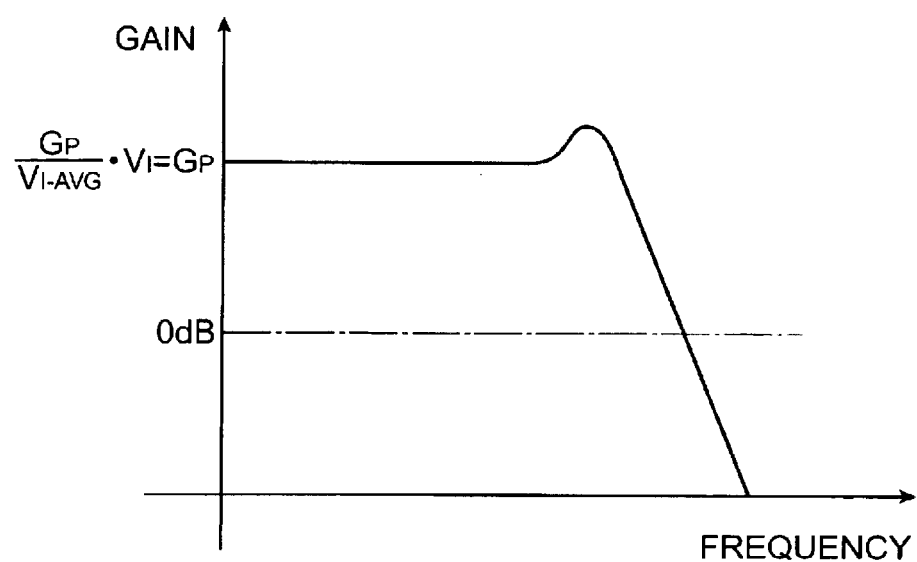
FIG. 6 is a frequency-gain characteristic diagram of the entire system including the DC-DC converter of FIG. 1.

Namely, the gain is adjusted by dividing the gain Gp of P control by the estimated average input voltage $V_{I\_AVG}$ ($=V_{REF}/D_{AVG}$) in the controller IC 7A, so as to make the gain G of the entire system independent of the input voltage $V_I$. For this reason, the gain G of the entire system remains unchanged even with change of the input voltage $V_I$. In passing, the gain of the DC/DC converter 1 includes the gain according to the frequency because of the inductor 4 and capacitor 5. Therefore, the gain of the entire system also equals Gp in the low frequency region but changes according to the frequency in the high frequency region, as shown in FIG. 6.

In the controller IC 7A, the pulse width (duty ratio) D being the output from the controller IC 7A is fed back to the control system, and the gain Gc of the control system is adjusted by the inverse ($D_{AVG}/V_{REF}$) of the average input voltage $V_{I\_AVG}$ whereby the gain G of the entire system stays unchanged even with change of the input voltage $V_I$. For this reason, the controller IC 7A is adaptable to a wide input voltage range and enables optimization of the phase margin. Therefore, the response is good even at low input voltages $V_I$, and no oscillation occurs of the output voltage even at high input voltages $V_I$.

The controller IC 7A is configured to detect the pulse width D of the PWM signal PS by the simple circuit configuration of the counter 10 and average the pulse widths D by making use of the averaging characteristic of the first-order low-pass filter 11 of the simple circuit configuration. Furthermore, the controller IC 7A estimates the average input voltage on the basis of the target voltage $V_{REF}$ and the average duty ratio $D_{AVG}$, without need for means for detecting the input voltage $V_I$ nor means for averaging the input voltages $V_I$. Since the controller IC 7A uses the target voltage $V_{REF}$ as an average of output voltages $V_o$, it does not have to be provided with means for averaging the output voltages $V_o$.

Figure 7:
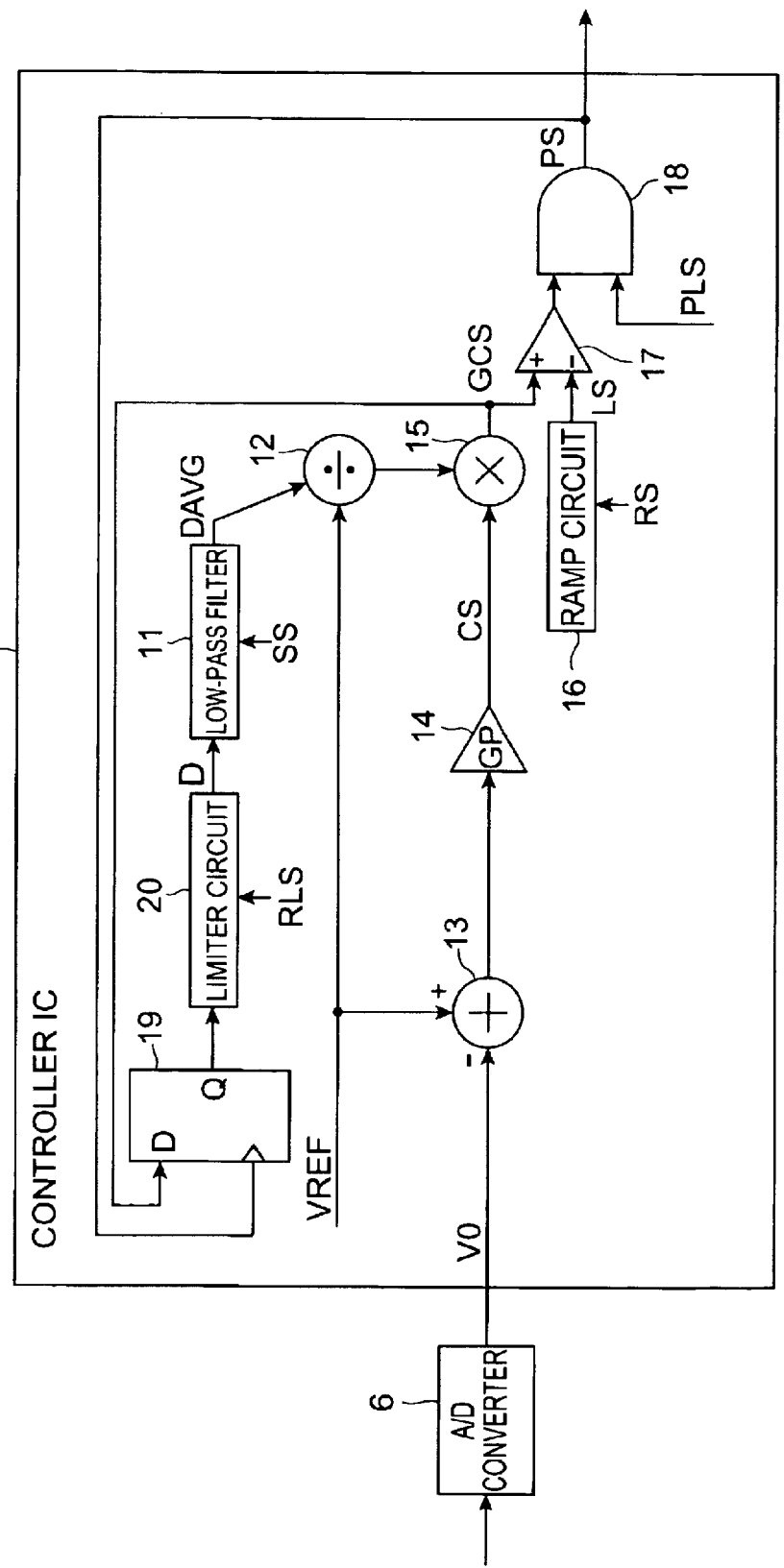
FIG. 7 is a diagram showing a configuration of a controller IC in the second embodiment.
Figure 8:
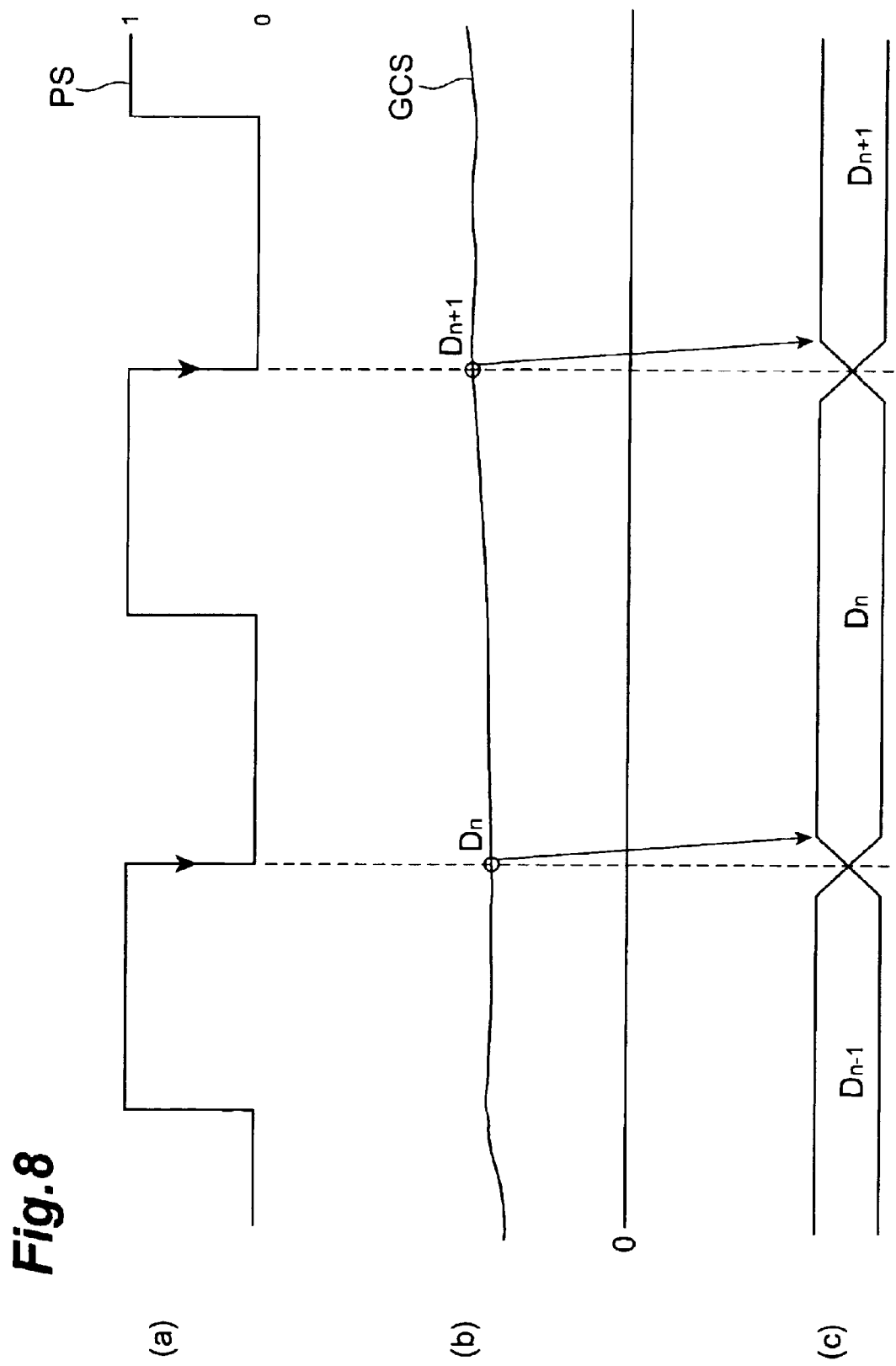
FIG. 8 is an illustration to illustrate detection of the pulse width at a D flip-flop circuit in FIG. 7, (a) represents a PWM signal, (b) a gain adjustment control signal, and (c) gain adjustment control signal values held.

The configuration of the controller IC 7B according to the second embodiment will be described below with reference to FIGS. 7 and 8. FIG. 7 is a diagram showing the configuration of the controller IC according to the second embodiment. FIG. 8 is an illustration to illustrate the detection of the pulse width at a D flip-flop circuit in FIG. 7, wherein (a) represents a PWM signal, (b) a gain adjustment control signal, and (c) values of the gain adjustment control signal held. In the controller IC 7B, the components similar to those in the controller IC 7A according to the first embodiment will be denoted by the same reference symbols, without redundant description thereof.

The controller IC. 7B has the configuration basically similar to that of the controller IC 7A in the first embodiment and operates in much the same manner, but is different therefrom only in the configuration for detecting the pulse width D and in the operation of detecting the pulse width D. The controller IC 7B is composed of a D flip-flop circuit 19, a limiter circuit 20, a low-pass filter 11, a divider 12, a subtractor 13, a multiplier 14, a multiplier 15, a ramp circuit 16, a comparator 17, and an AND circuit 18.

In the second embodiment, the D flip-flop circuit 19 corresponds to the delay device in the claims.

The D flip-flop circuit 19 detects the duty ratio D. For that, the D flip-flop circuit 19 receives the gain adjustment control signal GCS generated in the controller IC 7B and receives the PWM signal PS as a clock signal. The D flip-flop circuit 19 holds a value of the gain adjustment control signal GCS at a fall of a pulse of the PWM signal PS (a switchover from the high level to the low level) and outputs the held value of the gain adjustment control signal GCS to the limiter circuit 20 until a fall of a pulse in a next cycle of the PWM signal PS (cf. FIGS. 8(a) to (c)). Since falls of pulses of the PWM signal PS (i.e., the pulse widths D) are defined at points where the value of the gain adjustment control signal GCS equals the value of the ramp signal LS, the value of the gain adjustment control signal GCS at a fall of each pulse of the PWM signal PS is equivalent to the pulse width (duty ratio) D.

The limiter circuit 20 is a circuit similar to the AND circuit 18 and limits the value of the gain adjustment control signal GCS. For that, the limiter circuit 20 receives the value of the gain adjustment control signal GCS from the D flip-flop circuit 19 and a duty ratio limiting signal RLS. The limiter circuit 20 outputs the value of the gain adjustment control signal GCS itself when the value of the gain adjustment control signal GCS is not more than a limit indicated by the duty ratio limiting signal RLS, but outputs the limit when the value of GCS is greater than the limit. The value outputted from this limiter circuit 20 is the pulse with (duty ratio) D.

The operation of the controller IC 7B will be described with reference to FIGS. 7 and 8. The operation herein will be described about only differences from that of the controller IC 7A in the first embodiment.

The controller IC 7B holds the value of the gain adjustment control signal GCS at a fall of a pulse of the PWM signal PS generated, limits the value, and outputs the value as the pulse width D. Then the controller IC 7B infinitely averages the pulse widths D to obtain the average pulse width $D_{AVG}$.

This controller IC 7B has the effect similar to that of the controller IC 7A and is able to detect the pulse width D by the simple circuit configuration of the D flip-flop circuit 19, in place of the counter 10.

Figure 9:
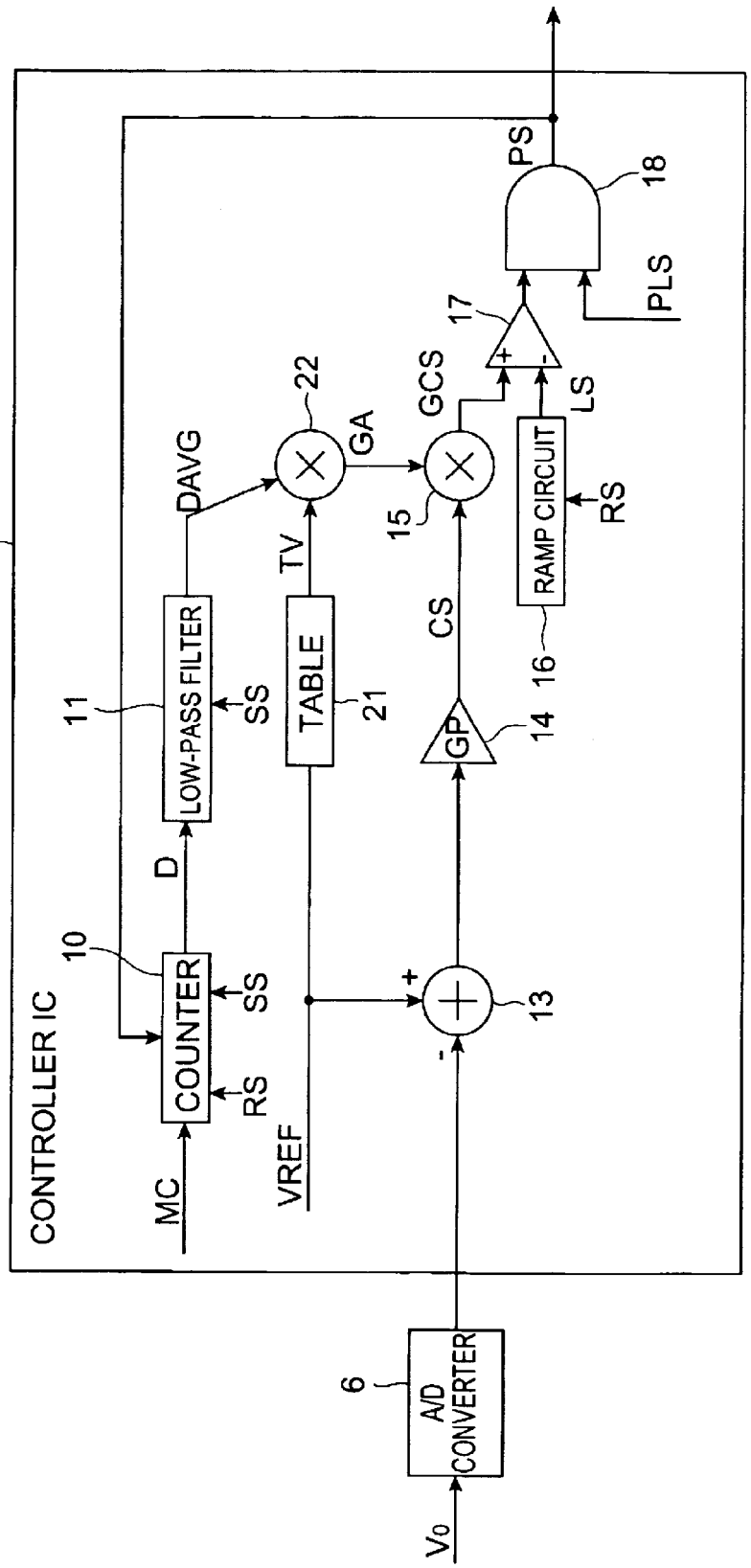
FIG. 9 is a diagram showing a configuration of a controller IC in the third embodiment.
Figure 10:
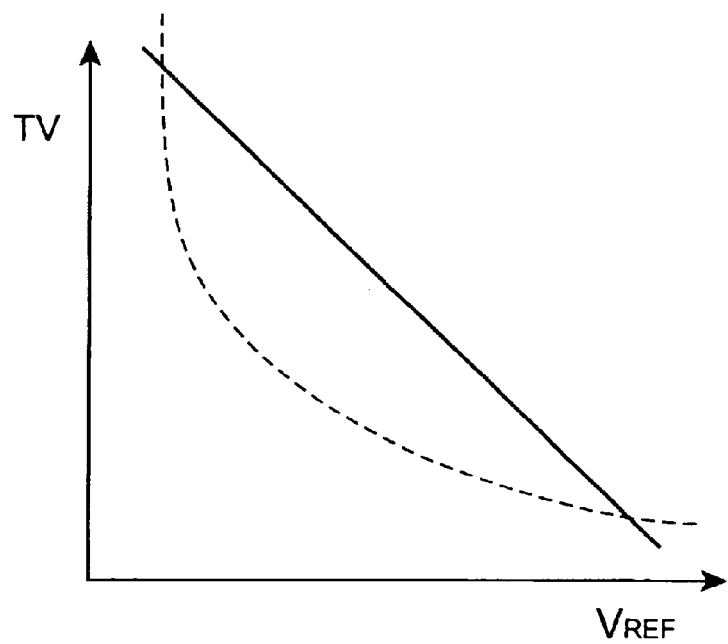
FIG. 10 is a graph showing table values against target voltages in a table in FIG. 9.

The configuration of the controller IC 7C according to the third embodiment will be described below with reference to FIGS. 9 and 10. FIG. 9 is a diagram showing the configuration of the controller IC according to the third embodiment. FIG. 10 shows table values against target voltages in a table in FIG. 9. In the controller IC 7C, the components similar to those in the controller IC 7A in the first embodiment will be denoted by the same reference symbols, without redundant description thereof.

The controller IC 7C has the configuration basically similar to that of the controller IC 7A in the first embodiment and operates in much the same manner, but is different therefrom only in the configuration for setting the gain adjustment value GA and in the operation of setting the gain adjustment value GA. The controller IC 7C is composed of a counter 10, a low-pass filter 11, a table 21, a multiplier 22, a subtractor 13, a multiplier 14, a multiplier 15, a ramp circuit 16, a comparator 17, and an AND circuit 18.

In the third embodiment, the table 21 and the multiplier 22 correspond to the gain adjustment value setting means in the claims; the table 21 to the converting means in the claims.

The table 21 is a table in which table values TV are set as values for conversion of target voltage $V_{REF}$. The table values TV set in the table 21 are not inverse values of the target voltage $V_{REF}$ (TV against $V_{REF}$ indicated by a dashed line in FIG. 10), but values of a first-order function having a negative proportionality factor (e.g., −1) with the target voltage $V_{REF}$ as a parameter (TV against $V_{REF}$ indicated by a solid line in FIG. 10). In passing, the table 21 is preliminarily stored in a memory means such as ROM or the like in the controller IC 7C.

The multiplier 22 receives a table value TV of the table 21 according to the target voltage $V_{REF}$, and the average pulse width $D_{AVG}$ from the low-pass filter 11, multiplies the average $D_{AVG}$ by the table value TV, and outputs the product $D_{AVG} \times TV$ as a gain adjustment value GA to the multiplier 15.

The operation of the controller IC 7C will be described with reference to FIGS. 9 and 10. The operation will be described herein about only differences from that of the controller IC 7A in the first embodiment.

The controller IC 7C retrieves a table value TV according to a target voltage $V_{REF}$ from the table 21. After the average pulse width $D_{AVG}$ is determined, the controller IC 7C multiplies the average pulse width $D_{AVG}$ by the retrieved table value TV to determine the gain adjustment value GA. Then the controller IC 7C multiplies the control signal CS by the gain adjustment value GA to generate the gain adjustment control signal GCS.

$$Gc = Gp \times (D_{AVG} \times TV) \quad (11)$$

In the controller IC 7C, as indicated by Eq (11), the gain Gc is a value obtained by multiplying the gain Gp of P control by the average pulse width $D_{AVG}$ and the table value TV. When Eq (11) is compared with Eq (2), it is seen that the controller IC 7C involves the multiplication by the table value TV, instead of the division by the target voltage $V_{REF}$ in the controller IC 7A. The table value TV is a value of a negative first-order function of the target voltage $V_{REF}$ and is not an inverse value of the target voltage $V_{REF}$. This is because the variation in the gain G of the entire system is reduced by employing the first-order function value, instead of the inverse value. A conceivable reason for it is internal loss or the like due to internal resistances of the respective elements in the DC/DC converter 1.

Figure 11:
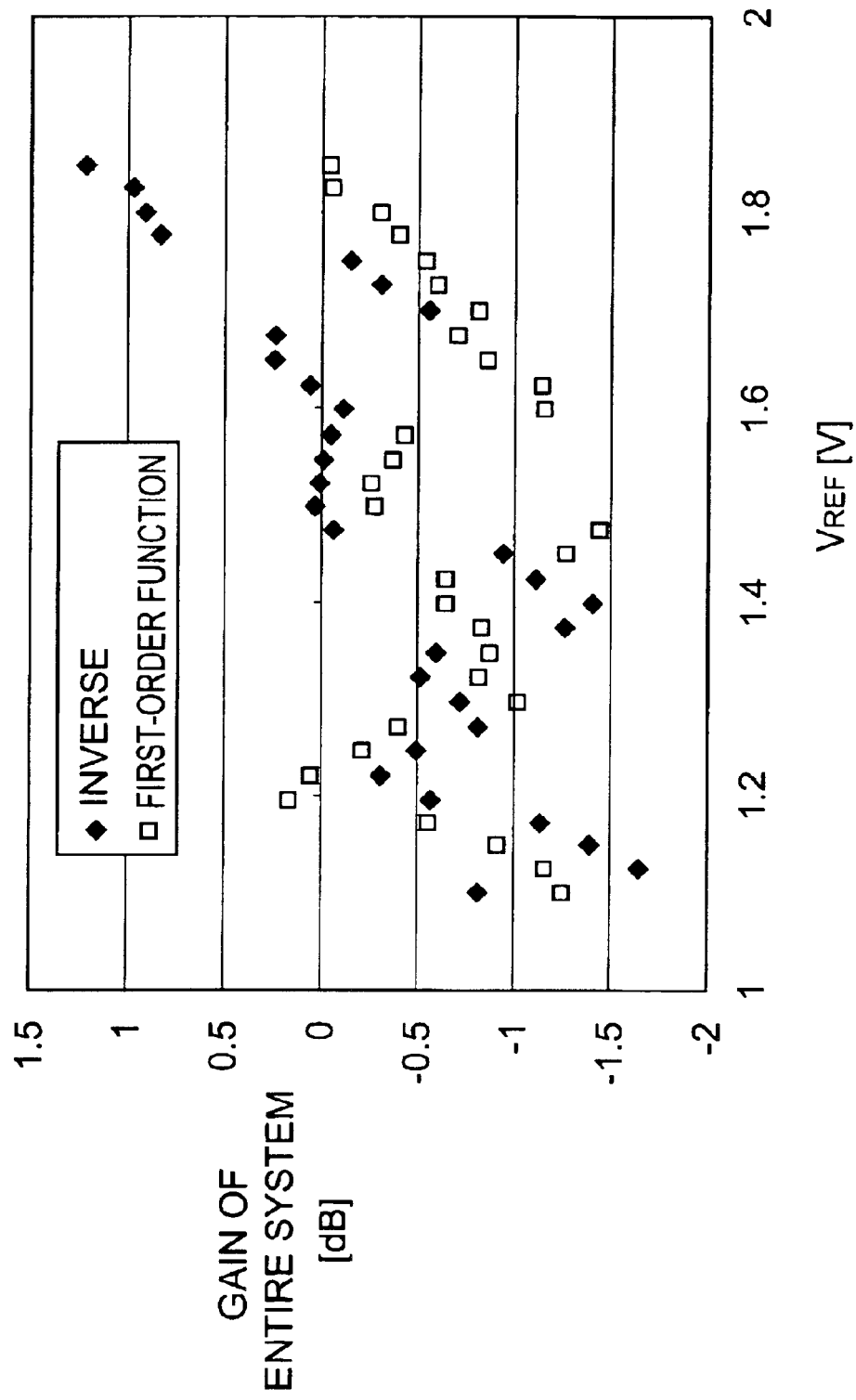
FIG. 11 is a graph of experiment data from measurement of the gain of the entire system with change of the target voltage where the DC/DC converter is controlled by the controller IC of FIG. 9.

FIG. 11 is a graph showing the results of an experiment of obtaining the gain G of the entire system against target voltage $V_{REF}$. This experiment was conducted at the frequency of 40 kHz in measurement, using the DC/DC converter 1 with the gain G of about 0 dB around 40 kHz. In FIG. 11, outline marks indicate experiment data where the table values TV in the table 21 are first-order function values, and black solid marks experiment data where the table values are inverse values. As apparent from FIG. 11, it is seen that the variation of gain G is smaller in use of the table 21 of first-order function values.

This controller IC 7C has the effect similar to that of the controller IC 7A and is able to set the gain adjustment value GA by the simple circuit configuration of the table 21 and the multiplier 22, instead of the divider of the complex circuit configuration. Furthermore, the controller IC 7C sets the table value TV of the table 21 not as an inverse value of the target voltage $V_{REF}$ but as a value of the first-order function, whereby it is able to reduce the variation of the gain G of the entire system.

Figure 12:
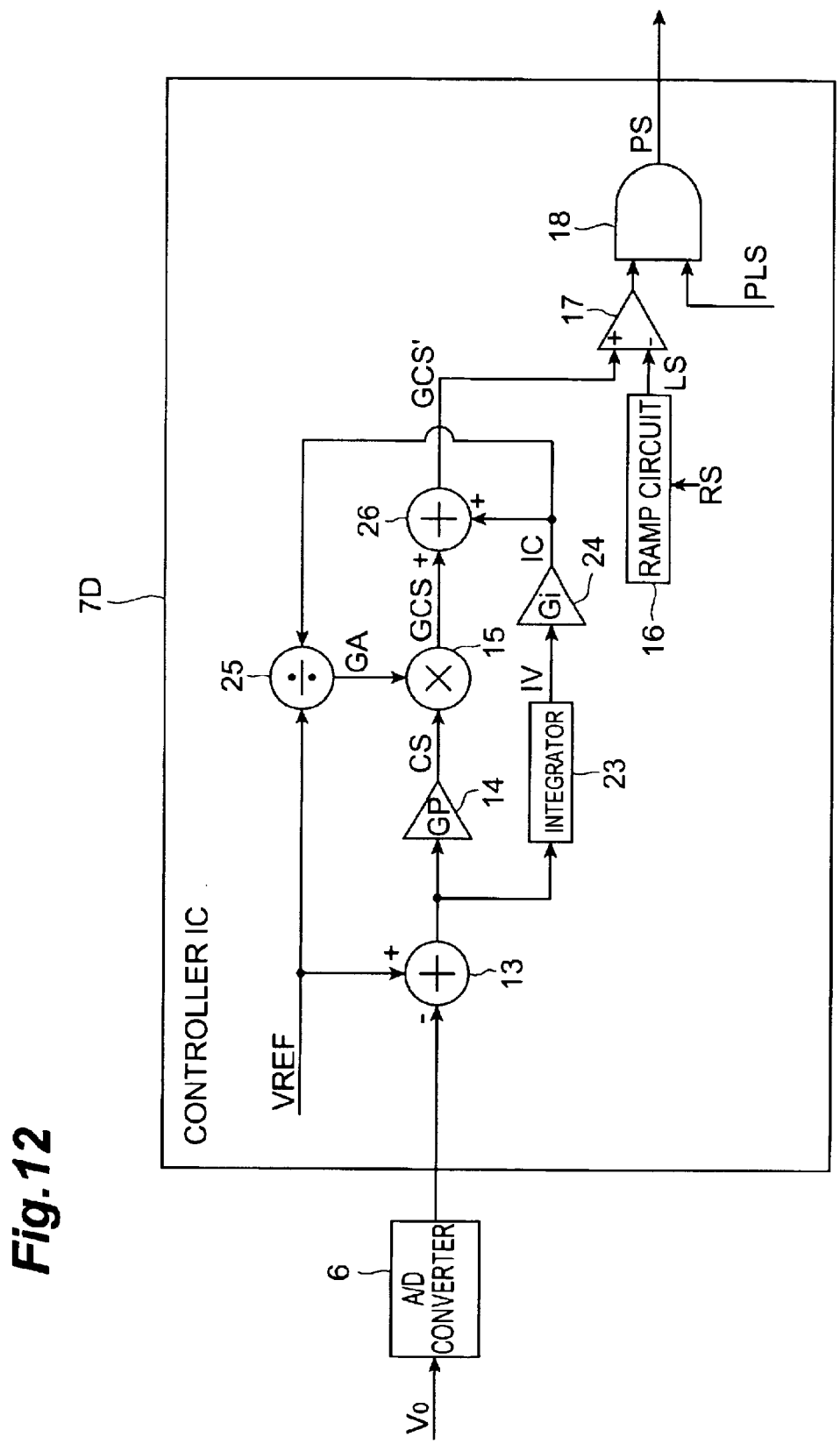
FIG. 12 is a diagram showing a configuration of a controller IC in the fourth embodiment.

The configuration of the controller IC 7D according to the fourth embodiment will be described below with reference to FIG. 12. FIG. 12 is a diagram showing the configuration of the controller IC according to the fourth embodiment. In the controller IC 7D, the components similar to those in the controller IC 7A in the first embodiment will be denoted by the same reference symbols, without redundant description thereof.

The controller IC 7D has the configuration basically similar to that of the controller IC 7A according to the first embodiment and operates in much the same manner, but is different only in that its control is the PI control and in that the configuration of I control also serves as a configuration of determining the average pulse width $D_{AVG}$. The controller IC 7D is composed of a subtractor 13, a multiplier 14, an integrator 23, a multiplier 24, a divider 25, a multiplier 15, an adder 26, a ramp circuit 16, a comparator 17, and an AND circuit 18.

In the fourth embodiment, the subtractor 13, the integrator 23, and the multiplier 24 correspond to the integration control means in the claims; the integrator 23 and multiplier 24 to the gain adjustment means in the claims.

The integrator 23 receives the difference $(V_{REF}-V_o)$, integrates the difference $(V_{REF}-V_o)$ over time, and outputs the integral IV to the multiplier 24.

The multiplier 24 receives the integral IV, multiplies the integral IV by the gain Gi of I control, and outputs the product Gi×IV as an integration control value IC to the adder 26. This integration control value IC is a value equivalent to the average duty ratio $D_{AVG}$ and is also fed to the divider 25 in order to calculate the gain adjustment value GA.

The divider 25 receives the target voltage $V_{REF}$ and the integration control value IC (the average duty ratio), divides the integration control value IC by the target voltage $V_{REF}$, and outputs the quotient $(IC/V_{REF})$ as a gain adjustment value GA to the multiplier 15.

The adder 26 receives the gain adjustment control signal GCS from the multiplier 15 and the integration control value IC from the multiplier 24, adds the integration control value IC to the gain adjustment control signal GCS, and outputs a gain adjustment control signal GCS' taking account of the integral control, to the comparator 17.

The operation of the controller IC 7D will be described below with reference to FIG. 12. The operation will be described herein about only differences from that of the controller IC 7A in the first embodiment.

The controller IC 7D subtracts the output voltage $V_o$ from the target voltage $V_{REF}$ and multiplies the difference between them by the gain Gp of P control to generate the control signal CS. Then the controller IC 7D integrates the difference over time and multiplies the integral IV by the gain Gi of I control to generate the integration control value IC. Furthermore, the controller IC 7D divides the integration control value IC by the target voltage $V_{REF}$ to obtain the gain adjustment value GA. Then the controller IC 7D multiplies the control signal CS by the gain adjustment value GA to generate the gain adjustment control signal GCS. Subsequently, the controller IC 7D adds the integration control value IC to the gain adjustment control signal GCS to generate the gain adjustment control signal GCS' taking account of the I control in addition to the P control. Then the controller IC 7D compares the gain adjustment control signal GCS' with the ramp signal LS.

This controller IC 7D has the effect similar to that of the controller IC 7A and utilizes the integration control value IC in the I control as an average duty ratio, without need for means for determining the average duty ratio. The controller IC 7D is able to suppress the steady-state deviation, because it takes account of the I control.

The above described the embodiments of the present invention, but it is noted that the present invention can be embodied in a variety of forms, without having to be limited to the above embodiments.

For example, the controller was constructed of the digital circuit (hardware) in the embodiments, but it may be constructed of an analog circuit. In the embodiments each of the means in the controller was configured by a digital circuit (hardware) of the controller IC, but each means of the controller may also be configured by a program (software) loaded on a computer such as a microcomputer or the like. The program to implement each means may also be distributed by storage media such as CD-ROM and others, or by delivery through the Internet or the like, or may also be distributed as a control unit installed in a computer.

The present invention was applied to the DC/DC converters in the embodiments, but the present invention is also applicable to AC/DC converters and DC/AC converters. The present invention was applied to the non-isolated and buck type converter without a transformer in the embodiments, but the present invention is also applicable to isolated converters with a transformer and to boost type or buck/boost type converters.

In the embodiments the duty ratio generating means was comprised of the counter performing the count-up operation during a high-level period of the PWM signal, or the D flip-flop circuit delaying the value of the gain adjustment control signal at a fall of a pulse of the PWM signal, but it may also be comprised of any other means such as a counter performing a count-down operation during a high-level period of the PWM signal. In the embodiments the duty ratio averaging means was comprised of the first-order low-pass filter of the IIR type, but it may also be comprised of any other low-pass filter such as an analog low-pass filter, an FIR type low-pass filter, a second-order low-pass filter, or the like, or may be comprised of any other circuit than the low-pass filters.

The present invention was applied to the P control and the PI control in the embodiments, but the present invention is also applicable to other controls including the PID control and others.

The embodiments employed the configuration using the target voltage in the setting of the gain adjustment value, but it is also possible to provide the system with an output voltage averaging means for obtaining an average of output voltages detected by a sensor or the like, and to adopt a configuration of setting the gain adjustment value from the average output voltage and the average duty ratio or a configuration of setting the gain adjustment value from the average output voltage and the duty ratio. Particularly, in cases where the output voltage is stable, the detected output voltage can be directly used without averaging the output voltage, for example, in a configuration wherein the gain adjustment value is set from the output voltage and the average duty ratio or in a configuration wherein the gain adjustment value is set from the output voltage and the duty ratio.

In the embodiments the converting means of the gain adjustment value setting means was comprised of the table, but, instead of the table, the converting means may also be comprised of a multiplier with a negative multiplication coefficient and an adder for adding an intercept. In the embodiments the table values in the table were set as values of the first-order function with the target voltage as a parameter, but they may be set as inverse values with the target voltage as a parameter or as optimal values according to the characteristics of the switching power supply.

In the embodiments the A/D converter and the controller IC were constructed as separate units, but the A/D converter may be incorporated in the controller IC.

In the embodiments the gain adjustment means was constructed using the multiplier in the control signal generating means so as to change the gain of the transfer function of the controller IC, or using the integrator to increase the low-frequency gain of the transfer function of the controller IC, but the gain adjustment means may also be constructed using any other means such as a low-pass filter or the like, or a phase compensation means may be constructed using a high-pass filter or the like.

According to the present invention, the average input voltage is estimated, and the gain is adjusted by the average input voltage, whereby it is feasible to stabilize the gain of the entire system including the switching power supply circuit even with change of the input voltage.

What is claimed is:

1. A switching power supply controller comprising:
   duty ratio generating means for detecting a duty ratio of a drive signal for controlling a switching element of a switching power supply and generating a signal corresponding to the duty ratio;
   control signal generating means for generating a control signal on the basis of a difference between a target voltage in the switching power supply and an output voltage detected in the switching power supply;
   operation means for generating a signal corresponding to a product of the signal corresponding to the duty ratio, and the control signal; and
   drive signal generating means for generating the drive signal on the basis of the signal generated by the operation means.

2. The switching power supply controller according to claim 1, wherein the control signal generating means comprises phase compensation means for carrying out a process for compensating for a phase in the switching power supply controller, for the difference.

3. The switching power supply controller according to claim 1, wherein the control signal generating means comprises gain adjustment means for carrying out a process for adjusting a gain in the switching power supply controller, for the difference.

4. The switching power supply controller according to claim 1, comprising gain adjustment value setting means for setting a gain adjustment value on the basis of the signal corresponding to the duty ratio and the output voltage detected in the switching power supply,
   wherein the operation means generates a signal corresponding to a product of the gain adjustment value and the control signal.

5. The switching power supply controller according to claim 4, comprising output voltage averaging means for obtaining an average of output voltages detected in the switching power supply,
   wherein the gain adjustment value setting means sets the gain adjustment value on the basis of the signal corresponding to the duty ratio and the average output voltage obtained by the output voltage averaging means.

6. The switching power supply controller according to claim 1, comprising gain adjustment value setting means for setting a gain adjustment value on the basis of the signal corresponding to the duty ratio, and the target voltage in the switching power supply,
   wherein the operation means generates a signal corresponding to a product of the gain adjustment value and the control signal.

7. The switching power supply controller according to claim 6, wherein the duty ratio generating means comprises duty ratio averaging means for obtaining an average of said duty ratios detected, and
   wherein the gain adjustment value setting means sets the gain adjustment value on the basis of the average duty ratio obtained by the duty ratio averaging means and the target voltage in the switching power supply.

8. The switching power supply controller according to claim 7, wherein the duty ratio averaging means is a low-pass filter.

9. The switching power supply controller according to claim 1, wherein the duty ratio generating means comprises a counter, and
   wherein the counter performs a counting operation every given time to detect an on period of the switching element in the drive signal.

10. The switching power supply controller according to claim 1, wherein the duty ratio generating means comprises a delay device, and
    wherein the delay device holds the signal generated by the operation means, for a predetermined time.

11. The switching power supply controller according to claim 1, comprising integration control means for integrating the difference between the target voltage in the switching power supply and the output voltage detected in the switching power supply to generate an integration control value,
    wherein the duty ratio generating means is comprised of the integration control means and wherein the integration control value generated by the integration control means is the signal corresponding to the duty ratio.

12. The switching power supply controller according to claim 4, wherein the gain adjustment value setting means comprises a divider, and
    wherein the divider divides the signal corresponding to the duty ratio generated by the duty ratio generating means, by the output voltage detected in the switching power supply, or by the average output voltage obtained by the output voltage averaging means to set the gain adjustment value.

13. The switching power supply controller according to claim 6, wherein the gain adjustment value setting means comprises a divider, and
    wherein the divider divides the signal corresponding to the duty ratio generated by the duty ratio generating means, by the target voltage in the switching power supply to set the gain adjustment value.

14. The switching power supply controller according to claim 4, wherein the gain adjustment value setting means comprises converting means and a multiplier,
    wherein the converting means sets a conversion value for the output voltage detected in the switching power supply, or the average output voltage obtained by the output voltage averaging means, and
    wherein the multiplier multiplies the signal corresponding to the duty ratio generated by the duty ratio generating means, by the conversion value set by the converting means, to set the gain adjustment value.

15. The switching power supply controller according to claim 6, wherein the gain adjustment value setting means comprises converting means and a multiplier,
    wherein the converting means sets a conversion value for the target voltage in the switching power supply, and wherein the multiplier multiplies the signal corresponding to the duty ratio generated by the duty ratio generating means, by the conversion value set by the converting means, to set the gain adjustment value.

16. The switching power supply controller according to claim 14, wherein the converting means sets the conversion value which linearly decreases against the output voltage detected in the switching power supply, or the average output voltage obtained by the output voltage averaging means.

17. The switching power supply controller according to claim 15, wherein the converting means sets the conversion value which linearly decreases against the target voltage in the switching power supply.

18. A switching power supply comprising:

a controller for generating a drive signal for switching control of a switching element; and a switching element adapted to turn on and off on the basis of the drive signal generated by the controller, wherein said controller is the controller as set forth in claim 1.

\* \* \* \* \*